(12) United States Patent
Wolf

(10) Patent No.: US 12,221,328 B2
(45) Date of Patent: Feb. 11, 2025

(54) WORK MACHINE

(71) Applicant: Komatsu America Corp., Chicago, IL (US)

(72) Inventor: Paul S. Wolf, Bark River, MI (US)

(73) Assignee: KOMATSU AMERICA CORP., Chicago, IL (US)

( * ) Notice: Subject to any disclaimer, the term of this patent is extended or adjusted under 35 U.S.C. 154(b) by 368 days.

(21) Appl. No.: 17/692,456

(22) Filed: Mar. 11, 2022

(65) Prior Publication Data
US 2022/0315392 A1 Oct. 6, 2022

Related U.S. Application Data

(60) Provisional application No. 63/167,949, filed on Mar. 30, 2021.

(51) Int. Cl.
*B66C 13/54* (2006.01)
*A01G 23/00* (2006.01)
*B66C 23/36* (2006.01)

(52) U.S. Cl.
CPC ............ *B66C 13/54* (2013.01); *A01G 23/003* (2013.01); *B66C 23/36* (2013.01)

(58) Field of Classification Search
CPC ......... B66C 13/54; B66C 23/36; B66C 1/585; B66C 1/68; A01G 23/003; A01G 23/00; B62D 33/07; B62D 33/067; E02F 9/166; E05B 81/10; E05B 81/16
See application file for complete search history.

(56) References Cited

U.S. PATENT DOCUMENTS

| 4,493,386 A | * | 1/1985 | Sonneborn | B62D 33/07 |
| | | | | 180/89.15 |
| 4,556,118 A | * | 12/1985 | London | B62D 33/07 |
| | | | | 180/89.15 |
| 7,396,070 B2 | * | 7/2008 | Albright | B62D 33/067 |
| | | | | 296/190.05 |

(Continued)

FOREIGN PATENT DOCUMENTS

| EP | 1 783 283 A1 | 5/2007 | |
| JP | 2017506202 A | * | 3/2017 |
| WO | WO-2005121461 A1 | * | 12/2005 | ......... B62D 33/0625 |

OTHER PUBLICATIONS

EP 1357078 A1 with English translation (Year: 2003).*

(Continued)

*Primary Examiner* — Lori Lyjak
(74) *Attorney, Agent, or Firm* — Global IP Counselors, LLP

(57) ABSTRACT

A work machine includes a ground propulsion apparatus, a undercarriage frame supported by the ground propulsion apparatus, a machine body supported by the undercarriage frame, a work implement attached to at least one of the undercarriage frame and the machine body, and a tilt mechanism. The machine body includes a chassis coupled to the undercarriage frame and a cab supported on the chassis. The tilt mechanism is arranged to tilt the cab relative to the chassis between an upright position and a recumbent position. The tilt mechanism includes an actuator arranged to move the cab relative to the chassis, and a lock arranged to selectively lock the cab in the upright position relative to the chassis.

23 Claims, 13 Drawing Sheets

(56) References Cited

U.S. PATENT DOCUMENTS

| | | | |
|---|---|---|---|
| 7,607,721 | B2 | 10/2009 | Grimes et al. |
| 8,936,600 | B2 * | 1/2015 | Soliman ............. A61B 17/1728 |
| | | | 606/104 |
| 9,096,280 | B2 | 8/2015 | Sintek et al. |
| 10,286,964 | B2 * | 5/2019 | Venugopal ......... B62D 33/0617 |
| 2004/0119320 | A1 | 6/2004 | Albright et al. |
| 2005/0264038 | A1 * | 12/2005 | Albright ................ E02F 9/166 |
| | | | 296/190.05 |
| 2013/0319285 | A1 * | 12/2013 | Davis .................... B62D 33/07 |
| | | | 296/190.05 |
| 2015/0251710 | A1 | 9/2015 | Deimel et al. |
| 2015/0367899 | A1 | 12/2015 | Christianson et al. |
| 2019/0071137 | A1 * | 3/2019 | Venugopal ......... B62D 33/0617 |
| 2021/0387682 | A1 * | 12/2021 | Kim ...................... B62D 33/07 |

OTHER PUBLICATIONS

The Office Action for the corresponding Finnish patent application No. 20225258, issued on Dec. 19, 2022.
The Search Report for the corresponding Finnish patent application No. 20225258, issued on Dec. 19, 2022.

* cited by examiner (RELEASE POSITION)

(LOCK POSITION)

(Tilting)

(Reversing)

WORK MACHINE

CROSS-REFERENCE TO RELATED APPLICATIONS

This application claims the benefit of U.S. Provisional Application No. 63/167,949 filed on Mar. 30, 2021. The entire disclosure of U.S. Provisional Application No. 63/167,949 is hereby incorporated herein by reference.

BACKGROUND

Field of the Disclosure

The present disclosure generally relates to a work machine. More specifically, the present disclosure relates to work machine with a tilting cab and a method of tilting a cab.

Background Information

A work machine is a machine used in construction, mining, forestry, farming, etc. Such work machines typically have at least one work implement coupled to the machine body and/or undercarriage frame. The work implement is typically controlled by an operator seated in a cab. The cab is disposed on top of the machine body or frame. The work implement is often movable but can be stationary in some cases. Such work machines include a ground propulsion apparatus that uses tracks or wheels to propel and/or steer the work machine. The tracks or wheels also serve to support the machine body of the work machine. Some examples of a work machine include a bulldozer, a dump truck, a front end loader, a backhoe, an excavator, a loader, a forwarder and a feller buncher or harvester.

SUMMARY

It has been discovered some work machines require a cab projecting upward relatively high for visibility by the operator when in operation.

Therefore, one object of the present disclosure is to provide a work machine with a cab the projects upward during operation to a suitable height to provide good visibility for the operator.

It has been further discovered that transporting such work machines can be difficult due to the height of the cab. Specifically, a work machine can be too high to travel on some highways.

Therefore, another object of the present disclosure is to provide a work machine which can be transported without being too high.

It has been further discovered that forestry machines are work machines particularly suited to a cab as described in the preceding objects.

Therefore, yet another object of the present disclosure is to provide a forestry machine which has cab as described in the preceding objects.

It has been further discovered that work machines can have a manual tilting structure in order to tilt the cab lower for transport. Manual tilting can be difficult to unmanageable for field operation especially with one operator. Special tools may also be needed.

Therefore, yet another object of the present disclosure is to provide a work machine, which uses an assisted (e.g., hydraulically and/or electrically) tilting mechanism that can be easily operated by a single individual, and without the need for special tools.

It has been further discovered that some existing work machines have a manual locking structure for the manual tilting structure, which can be difficult and time consuming to operate. Special tools may also be needed.

Therefore, yet another object of the present disclosure is to provide a work machine which uses an assisted (e.g., hydraulically and/or electrically) locking mechanism, and without the need for special tools.

With a work or forestry machine in accordance with one or more of the above objects, a single operator can unlock and tilt a cab for transport. In addition, after transport, a single operator can un-tilt and relock the cab for operation after transport. Therefore, during operation the cab can be sufficiently high and provide good visibility, and during transport the cab can be lower so as to be easily transported on standard roads. However, the tilting/locking can be relatively easily performed by a single operator.

In view of the state of the known technology and in accordance with a first aspect of the present disclosure, a work machine is basically provided that comprises a ground propulsion apparatus, a undercarriage frame supported by the ground propulsion apparatus, a machine body supported by the undercarriage frame, a work implement attached to at least one of the undercarriage frame and the machine body, and a tilt mechanism. The machine body includes a chassis coupled to the undercarriage frame and a cab supported on the chassis. The tilt mechanism is arranged to tilt the cab relative to the chassis between an upright position and a recumbent position. The tilt mechanism includes an actuator arranged to move the cab relative to the chassis, and a lock arranged to selectively lock the cab in the upright position relative to the chassis.

In accordance with a second aspect of the present disclosure, the work machine according to the first aspect is configured so that the actuator is a hydraulic tilt actuator.

In accordance with a third aspect of the present disclosure, the work machine according to the first or second aspect is configured so that the lock includes at least one lock device movable between a lock position to lock the cab in the upright position and a release position in which the cab is movable from the upright position.

In accordance with a fourth aspect of the present disclosure, the work machine according to the third aspect is configured so that the at least one lock device includes a hydraulic lock pin.

In accordance with a fifth aspect of the present disclosure, the work machine according to the third or fourth aspect is configured so that the lock further includes at least one biasing member normally biasing the at least one lock device toward the lock position.

In accordance with a sixth aspect of the present disclosure, the work machine according to any of the third to fifth aspects is configured so that the lock further includes a sensor arranged to detect whether the at least one lock device is in the lock position or the release position, and the cab includes an indicator configured to notify an operator that the at least one lock device is not in the lock position.

In accordance with an seventh aspect of the present disclosure, the work machine according to any of the third to fifth aspects is configured so that lock further includes a sensor arranged to detect whether the at least one lock device is in the lock position or the release position, and at least one operation of the work machine is disabled in response to detection by the sensor that the at least one lock device is not in the lock position.

In accordance with a eighth aspect of the present disclosure, the work machine according to any of the first to seventh aspects further includes a tilt controller operatively connected to the tilt mechanism, the tilt controller being operable by an operator to control the actuator and the lock to move the cab between the upright and recumbent positions, and the tilt controller is disposed outside of the cab.

In accordance with an ninth aspect of the present disclosure, the work machine according to any of the first to eighth aspects is configured so that the tilt mechanism includes a lower riser attached to the chassis and an upper riser attached to the cab, the upper riser being pivotally coupled to the lower riser.

In view of the state of the known technology and in accordance with a tenth aspect of the present disclosure, a method of moving a cab of a work machine is basically provided that comprises tilting the cab relative to a chassis of a machine body from an upright position to a recumbent position. The tilting the cab includes moving a lock from a lock position to a release position, the lock selectively locking the cab in the upright position relative to the chassis in the lock position. The tilting the cab includes, once the lock is in the release position, moving the cab relative to the chassis from the upright position to a recumbent position.

In accordance with a eleventh aspect of the present disclosure, the method according to the tenth aspect is configured so that the moving the cab relative to the chassis is performed by hydraulic actuation.

In accordance with a twelfth aspect of the present disclosure, the method according to the tenth or eleventh aspect is configured so that the moving the lock is performed by hydraulic actuation.

In accordance with a thirteenth aspect of the present disclosure, the method according to any of the tenth to twelfth aspects is configured so that the lock is biased toward the lock position by a biasing member.

In accordance with a fourteenth aspect of the present disclosure, the method according to any of the tenth to thirteenth aspects further includes determining whether the lock is in the lock position or the release position.

In accordance with a fifteenth aspect of the present disclosure, the method according to fourteenth aspect further includes indicating in an interior of the cab when the lock is not in the lock position.

In accordance with an sixteenth aspect of the present disclosure, the method according to fourteenth or fifteenth aspect further includes disabling at least one operation of the work machine in response to determining that the at least one lock pin is not in the lock position.

In accordance with a seventeenth aspect of the present disclosure, the method according to any of the tenth to sixteenth aspects further includes operating a tilt controller outside the cab to control movement of the cab and lock.

In accordance with a eighteenth aspect of the present disclosure, the method according to any of the tenth to seventeenth aspects further includes receiving the signal to tilt the cab to the recumbent position, the moving the lock to the release position occurring upon receiving the signal, and determining the lock in the release position, the moving the cab to the recumbent position occurring in response to determining that the lock in the release position.

In view of the state of the known technology and in accordance with a nineteenth aspect of the present disclosure, a method of moving a cab of a work machine is basically provided that comprises tilting the cab relative to a chassis of a machine body from a recumbent position to an upright position. The tilting the cab includes moving the cab from the recumbent position to the upright position, and once the cab is in the upright position, moving a lock from a release position to a lock position, the lock selectively locking the cab in the upright position relative to the chassis in the lock position.

In accordance with a twentieth aspect of the present disclosure, the method according to nineteenth aspect further includes receiving the signal to tilting cab to upright position, the moving the cab to the upright position occurring upon receiving the signal, and determining whether the cab in the upright position. The moving the lock to the lock position occurring in response to determining that the cab is in the upright position.

Also, other objects, features, aspects and advantages of the disclosed work machine will become apparent to those skilled in the work machine field from the following detailed description, which, taken in conjunction with the annexed drawings, discloses one embodiment of the work machine.

BRIEF DESCRIPTION OF THE DRAWINGS

Referring now to the attached drawings which form a part of this original disclosure.

DETAILED DESCRIPTION OF THE EMBODIMENT(S)

Selected embodiments will now be explained with reference to the drawings. It will be apparent to those skilled in the art from this disclosure that the following descriptions of the embodiments are provided for illustration only and not for the purpose of limiting the disclosure as defined by the appended claims and their equivalents.

Figure 1:
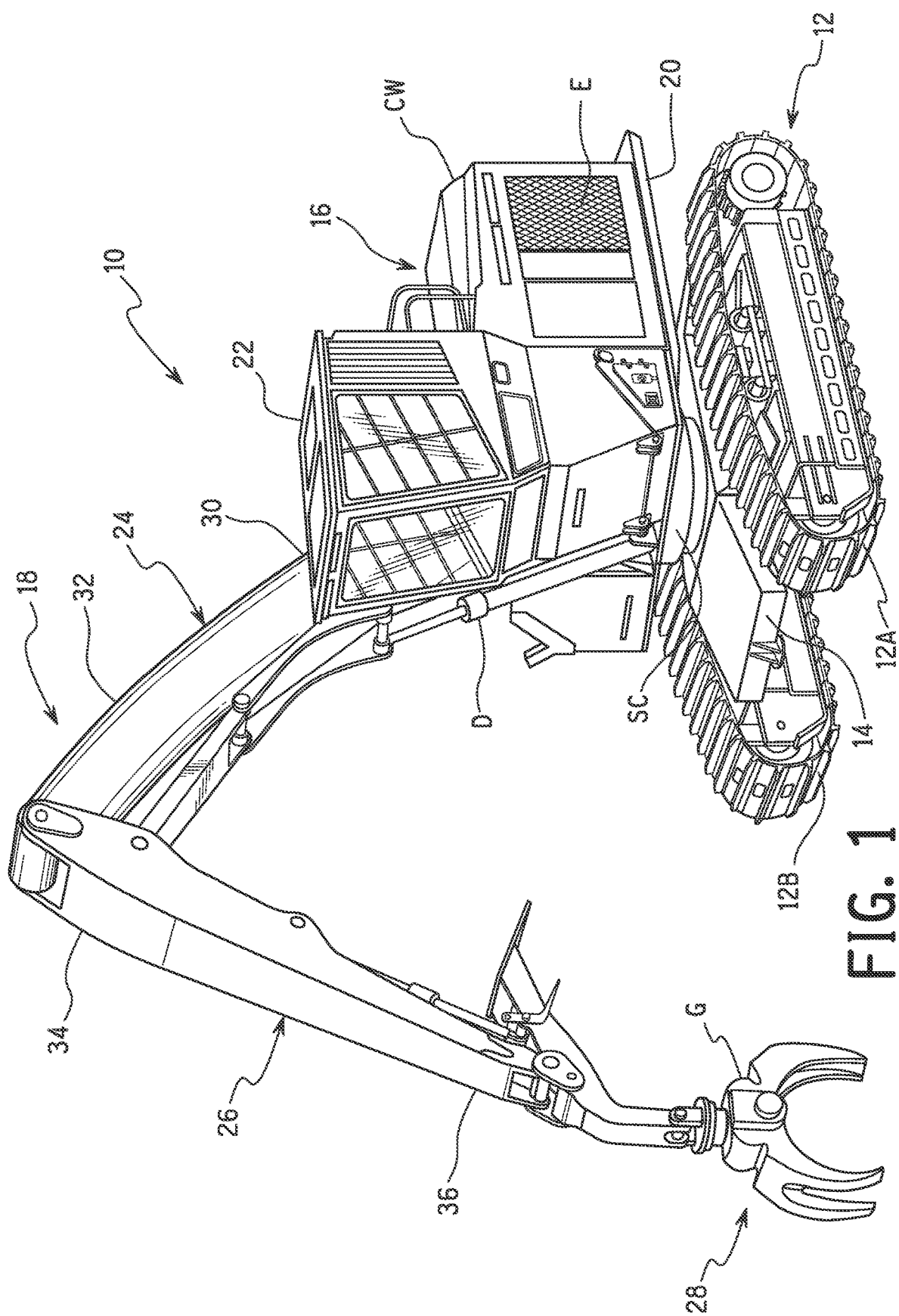
FIG. 1 is a left front perspective view of a work machine in accordance with a first embodiment.
Figure 2:
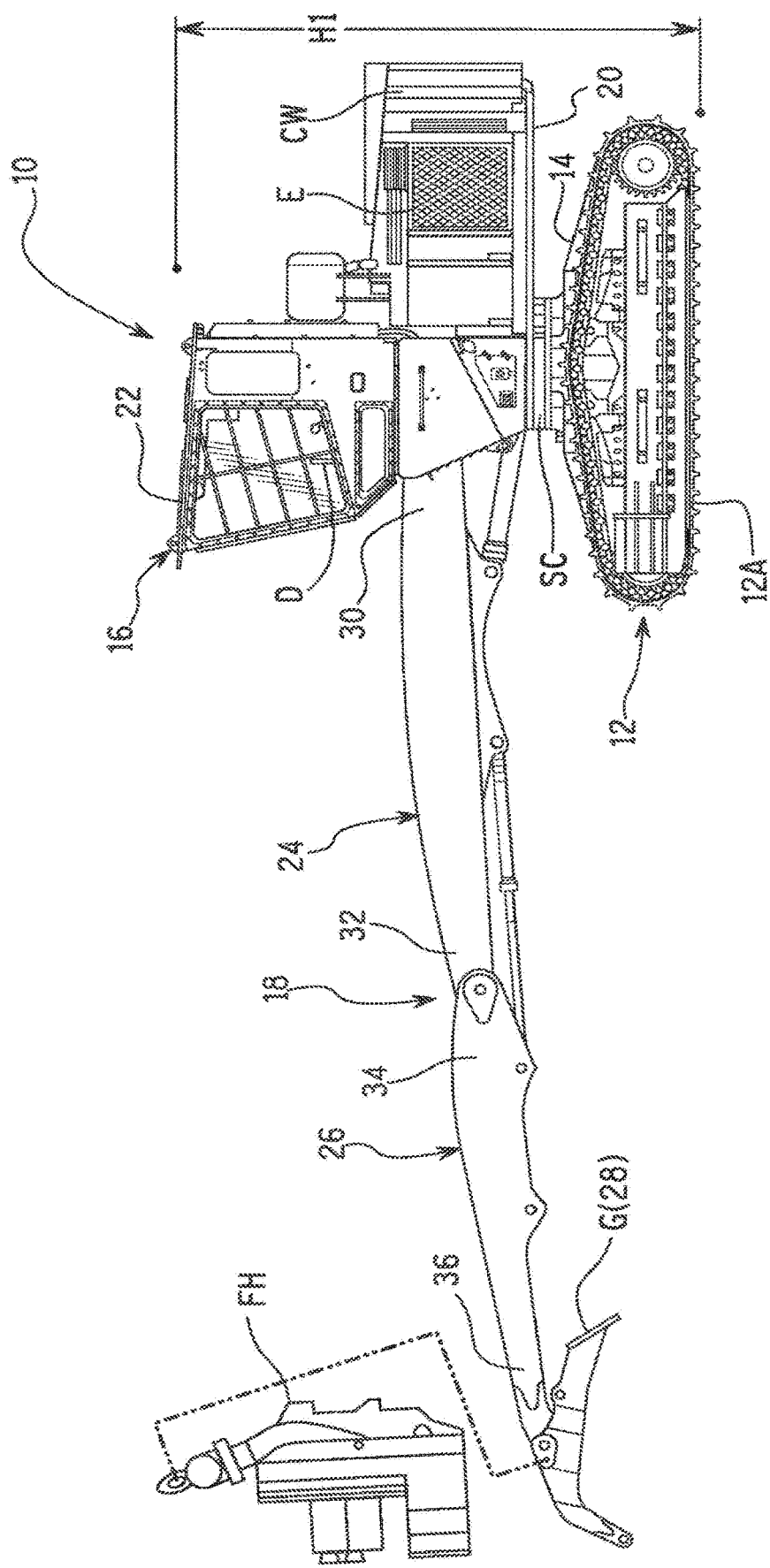
FIG. 2 is left side elevational view of the work machine illustrated in FIG. 1, with the cab in a first (second), upright, operating position.
Figure 3:
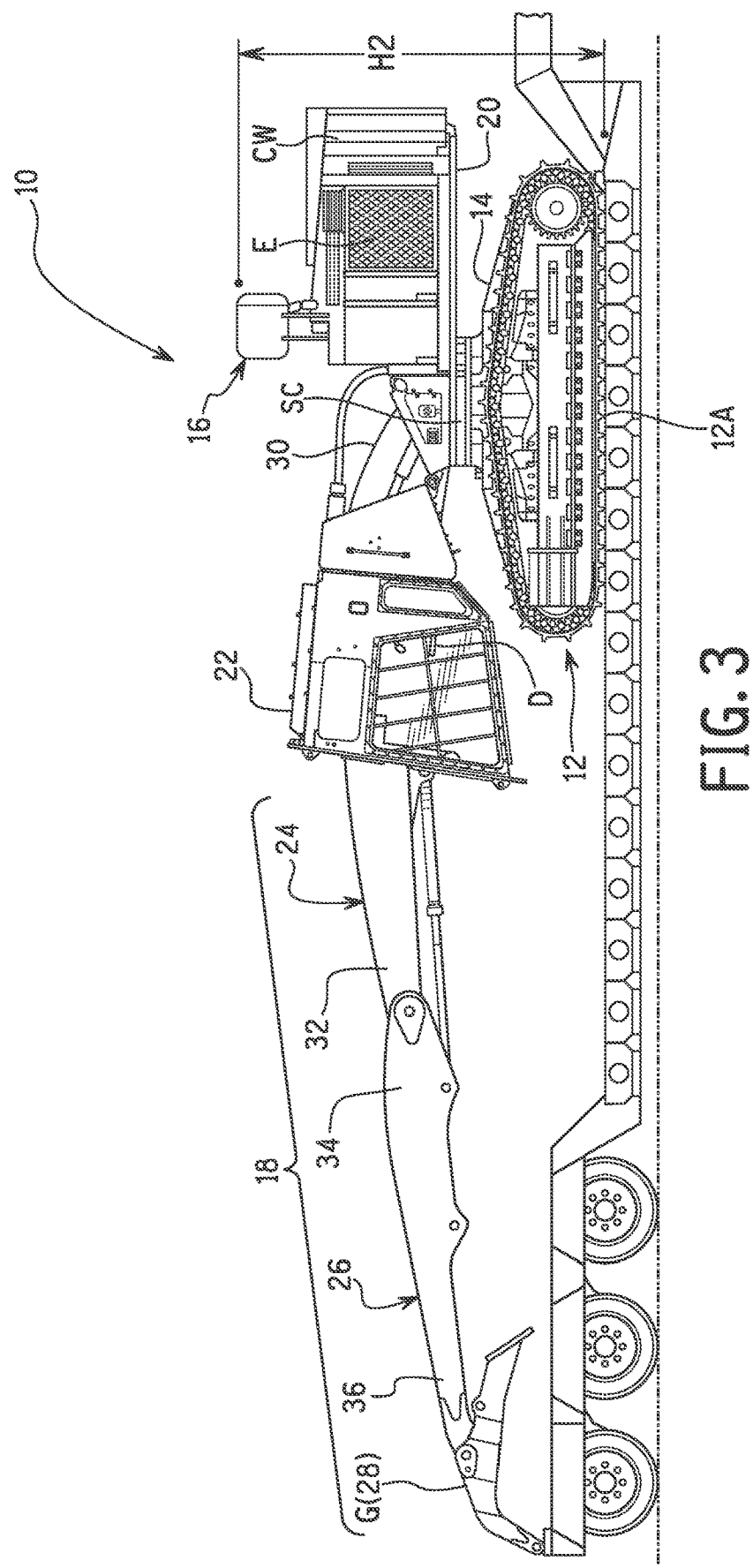
FIG. 3 is left side elevational view of the work machine illustrated in FIGS. 1-2, with the work machine on a transport trailer and with the cab in a second (first), retracted, tilted, transport position.

Referring initially to FIGS. 1-3, a work machine 10 is illustrated in accordance with one illustrated embodiment. The work machine 10 can also be considered a work machine 10. As explained below, the work machine 10 is configured to improve transportation of the work machine 10. More specifically, the operator cab 22 can be tilted (retracted) downwardly from the upright operating position shown in FIG. 2 to the recumbent transport position shown in FIG. 3 so that the operator cab 22 does not project too far in the upward direction during transport.

A single operator can perform the tilting operation, or a reversing operation to un-tilt or reverse (extend) the cab 22 to the position shown in FIG. 2 from the position shown in FIG. 3. In the illustrated embodiment, the work machine 10 is forestry machine, such as a long tail tracked logging machine or harvester. Thus, as shown in FIG. 2, the work machine 10 can have a logging attachment (grapple) G or a harvester head (feller head) FH attached to a work implement 18. While it will be apparent to those skilled in the art from this disclosure that certain aspects may be particularly beneficial in a forestry machine, it will also be apparent that many of the aspects of the work machine 10 can be applied to other types of work machines.

In the illustrated embodiment, the work machine 10 is a tracked work machine that includes a ground propulsion apparatus 12, an undercarriage frame 14, a machine body 16, and a work implement 18. The ground propulsion apparatus 12 has a pair of tracks used to propel and maneuver the work machine 10 in a conventional manner. However, it will be apparent to those skilled in the work machine field from this disclosure that the present disclosure is also applicable the wheeled work machines in which the tracks are replaced by wheels. The ground propulsion apparatus 12 supports the undercarriage frame 14, which in turn supports the machine body 16. The machine body 16 is pivotally supported by the ground propulsion apparatus 12 via the undercarriage frame 14. More specifically, the machine body 16 is preferably attached to the undercarriage frame 14 by a swivel connection SC such that the machine body 16 can be to be selectively rotated 360 degrees relative to the undercarriage frame 14 and the ground propulsion apparatus 12. The work implement 18 is preferably movably attached to the machine body 16. In any event, the work implement 18 attached to at least one of the undercarriage frame 14 and the machine body 16. 17.

The machine body 16 includes a deck or chassis 20 on which an operator cab 22 as well as other components such as an engine E, hydraulic system components, a work tool mounting area, a counterweight CW, etc. are disposed. Thus, the machine body 16 preferably includes an engine E mounted on the chassis 20, the engine powering a hydraulic circuit HC (FIG. 15) that operates a tilt mechanism 40 in accordance with the present disclosure, discussed below. Additional conventional hydraulic components (not shown) are preferably provided to control the work implement 18, the ground propulsion apparatus 12, etc. in a conventional manner. These components will not be discussed and/or illustrated in detail herein, except as related to the present disclosure.

An operator can operate the work machine 10 from the cab 22. Other than the cab 22 and the manner in which the cab 22 is mounted on and movable relative to the chassis 20, the components of the machine body 16 are conventional. Therefore, the machine body 16 will not be explained and/or illustrated in detail herein except as related to the present disclosure. While the drawing figures generally illustrate the work machine 10 from a left side, the right side of the work machine is similarly configured and is substantially a mirror image of the left side. Of course, it will be apparent to those is skilled in the art from this disclosure that the cab 22 is mounted on the left side of the chassis 20 and the work implement 18 is mounted on the right side of the chassis 20.

Referring still to FIGS. 1-3, in the illustrated embodiment, the work implement 18 includes a boom 24, an arm 26 and an attachment or work tool 28. In the illustrated embodiment, the work tool 28 is a logging grapple G. However, the work tool 28 can be a harvester head/attachment FH that includes a high-speed disc saw. The boom 24 has a body attachment end 30 and an arm attachment end 32. The body attachment end 30 is movably attached to at least one of the undercarriage frame 14 and the machine body 16. The arm attachment end 32 is attached to the arm 26. The arm 26 has a boom attachment end 34 and a tool attachment end 36. The boom attachment end 34 is pivotally coupled to the arm attachment end 34. The work tool 28 is coupled to the tool attachment end 36 of the arm 26 in a conventional manner.

A pivotal connection attaches the boom 24 to the arm 26 in a conventional manner, such that the work machine can be operated with the boom 24 and the arm 26 in a plurality of orientations. The boom 24 and the arm 26 are operated using the hydraulic system in a conventional manner. While in the illustrated embodiment, the work machine 10 is a track logging machine in which the work implement 18 includes the boom 24, the arm 26, and the grapple G (or feller head FH) as the work tool 28, it will be apparent to those skilled in the art from this disclosure that the present disclosure could be applicable to any work machine having any work implement (e.g., a bucket, an excavator, etc.). Nevertheless, the present disclosure is particularly suited to forestry machines (e.g., a logging machine, a harvesting machine, a forestry excavator, etc.).

The ground propulsion apparatus 12 of the illustrated embodiment includes an undercarriage and other conventional parts that enable the work machine 10 to move along a ground surface. In the illustrated embodiment, the ground propulsion apparatus 12 includes a left or first track 12A and a right or second track 12B as shown in FIG. 1. The first and second tracks 12A and 12B are arranged to contact the ground surface. The first and second tracks 12A and 12B are driven by, for example, a hydraulic motor of a hydraulic system (not shown). In the illustrated embodiment, the work machine 10 is a long tail tracked logger in that the rear end of the machine body 16 extends beyond the first and second tracks. Thus, a rearmost portion of the machine body 16 is positioned rearward with respect to a rearmost end of the first and second tracks 12A and 12B when the machine body 16 is oriented facing forward without a swing angle, as shown in FIGS. 2-3.

Although the ground propulsion apparatus 12 of the illustrated embodiment has the first and second tracks 12A and 12B, the disclosure is not limited to a work machine that uses tracks. For example, the ground propulsion apparatus 12 can include wheels or some other means of moving the work machine 10 along the ground. In addition, this disclosure is not limited to long tailed work machines and is also applicable to short tail work machines.

Referring again to FIG. 1, the undercarriage frame 14 is basically a frame to which the ground propulsion apparatus 12 is attached. The undercarriage frame 14 is supported with respect to the ground surface by the ground propulsion apparatus 12 and serves to support the machine body 16 with respect to the ground propulsion apparatus 12. The undercarriage frame 14 is configured to support the swivel connection SC that supports the machine body 16. The swivel connection SC includes a swing bearing and a swing motor. In the illustrated embodiment, the swing motor, the swing bearing, and the machine body 16 are coupled together such that the machine body 16 can be rotated about a vertical swing axis by the swing motor. The machine body 16 is supported on the swivel connection SC such that the machine body 16 is swingably mounted to the undercarriage frame 14 about the vertical swing axis. Although the illustrated embodiment is provided with the swivel connection SC, the disclosure is not limited to a work machine that includes a swivel. The machine body 16 can be non-rotatable or fixed with respect to the undercarriage frame 14.

Referring again to FIGS. 1-3, the operator cab 22 includes a driver's seat, at least one display D and a various operating members (not shown) used by the operator to operate the work machine 10, as shown in FIG. 1. In the illustrated embodiment, operating members are provided to be operated by hand, and pedal type operating members are provided on the floor to be operated by foot. There are no particular limitations on the arrangement and type of operating members provided in the operator cab 22. The operating members are preferably arranged in positions where they are easy for the operator to access and do not obstruct the operator's field of view. In normal operation, the cab 22 is disposed in an upright, operating positions shown in FIGS. 1-2. In this position, the cab projects vertically a height H1, e.g., about 17 feet, which may be too high to be transported on a trailer. Therefore, the cab 22 can be tilted to the recumbent (retracted, transport) position shown in FIG. 3. The height H2 in FIG. 3 is about 75% to 80% of the height H1 in FIG. 2. These dimensions are mere examples and can be different.

Figure 4:
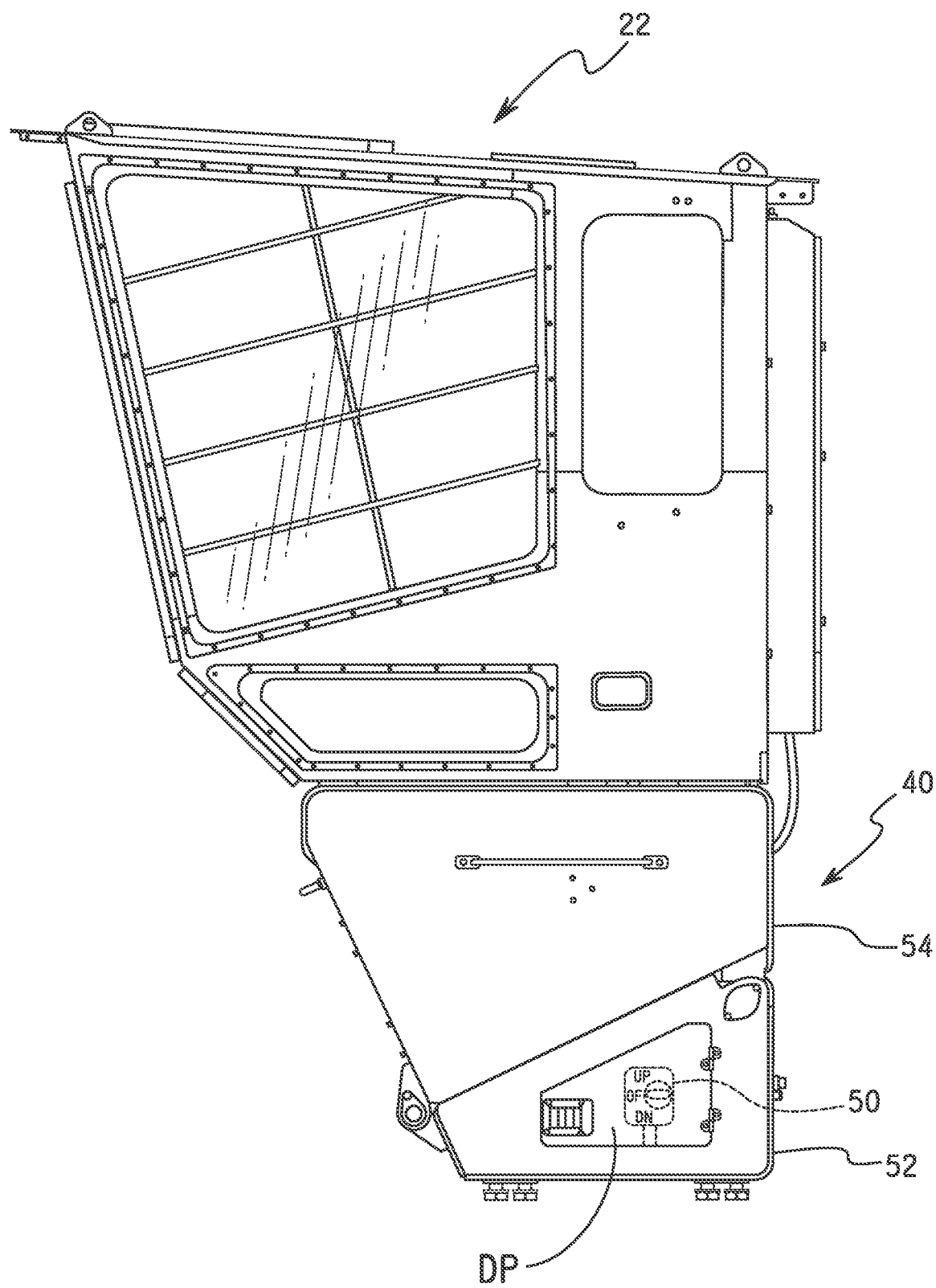
FIG. 4 is an enlarged left side elevational view of the cab structure of the work machine illustrated in FIGS. 1-3, with the cab in the first (second), upright, operating position.
Figure 5:
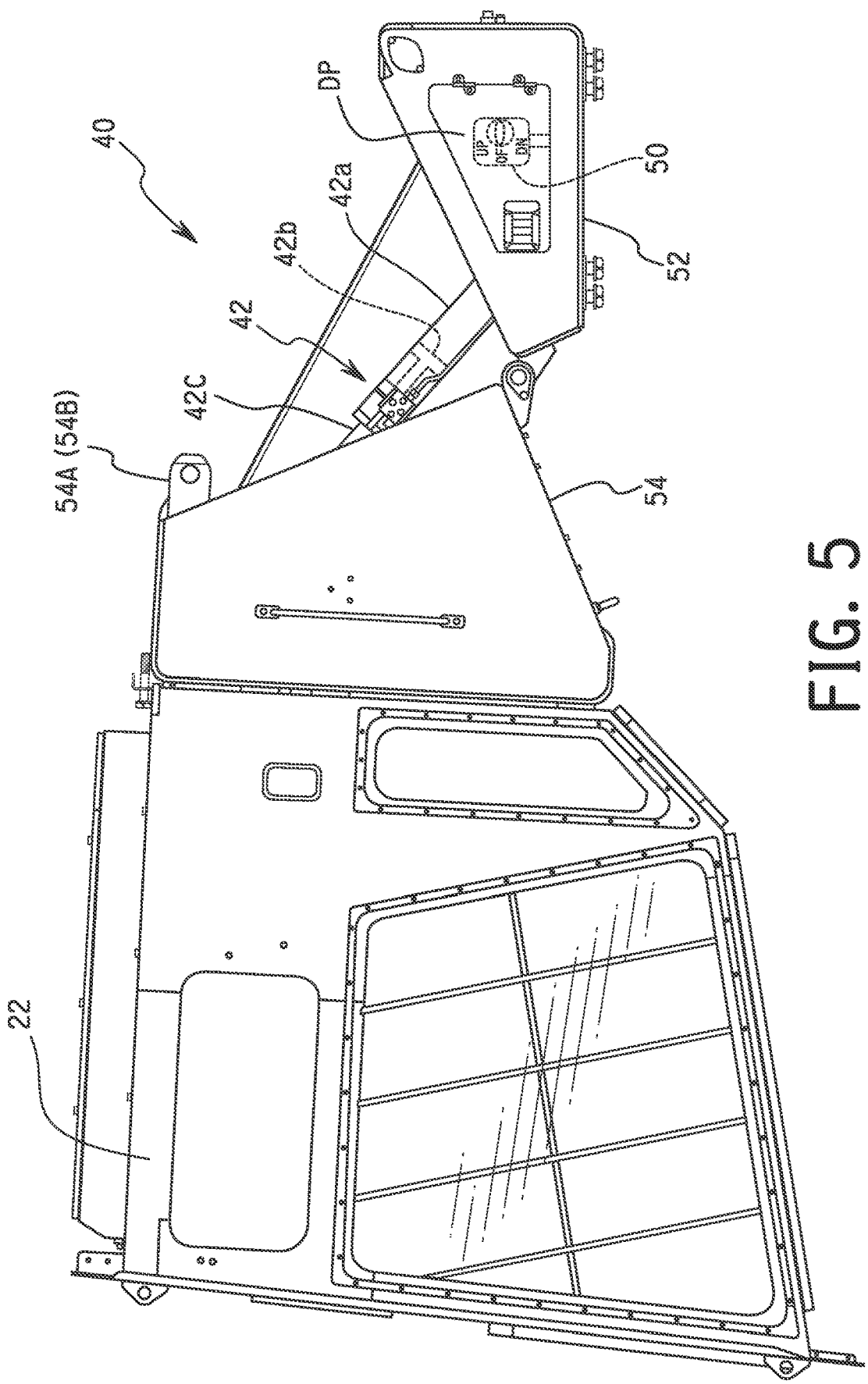
FIG. 5 is left side elevational view of the cab structure of the work machine illustrated in FIGS. 1-3, with the cab in the second (first), retracted, tilted, transport position.
Figure 6:
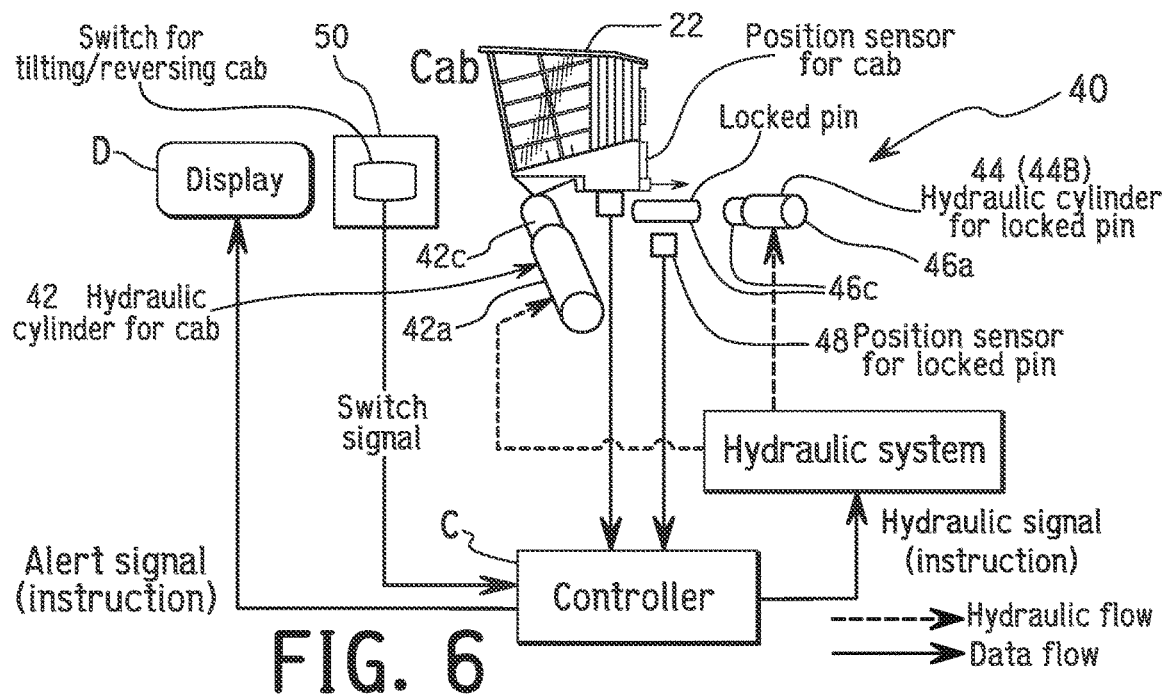
FIG. 6 is a diagrammatic schematic illustration of the tilting mechanism and cab of the work machine illustrated in FIGS. 1-5.

Referring now to FIGS. 4-12, the cab 22 is supported on the chassis 20 of the machine body 16 as mentioned above. A tilting mechanism 40 in accordance with the present disclosure is arranged to move the cab 22 relative to the chassis 20 between the positions shown in FIGS. 4-5. More specifically, the tilt mechanism 40 is arranged to tilt the cab 22 relative to the chassis 20 between an upright position (FIG. 4) and a recumbent position (FIG. 5). The positions can also be considered operating and transport positions, respectively. Alternatively, the positions can be considered first and/or second positions, respectively.

The tilting mechanism 40 basically includes a tilt actuator 42 and a lock 44. The tilt actuator 42 moves the cab 22 between the positions shown in FIGS. 4-5. However, the lock 44 locks the cab 22 in the position shown in FIG. 4 when locked. Thus, in order to move the cab 22 from the position shown in FIG. 3, the lock 44 has to be unlocked or released. Then the tilt actuator 42 can move the cab 22 to the position shown in FIG. 5. When the cab 22 is in the position shown in FIG. 5, the lock 44 remains unlocked. When the cab is moved from the position shown in FIG. 5 to the position shown in FIG. 4, the tilt actuator 42 moves the cab 22 back to the position shown in FIG. 4. Once the cab 22 returns to the position shown in FIG. 4, the lock 44 locks the cab 22 in position.

Referring to FIGS. 4-7, 9, 11 and 12 the tilt actuator 42 is an actuator arranged to move the cab 22 relative to the chassis 20. In the illustrated embodiment the tilt actuator 42 is a hydraulic tilt actuator disposed in the hydraulic circuit HC of FIG. 15. An example of a hydraulic tilt actuator 42 is a hydraulic cylinder as shown in FIGS. 5-7, 9 and 15. Hydraulic cylinders are conventional, and thus, will not be explained and/or illustrated in further detail herein, except as related to the present disclosure. Thus, the hydraulic tilt cylinder 42 basically includes an outer cylinder 42a, a piston 42b and an arm 42c coupled to the piston 42b with hydraulic lines extending to spaces of the outer cylinder 42a on opposite sides of the piston 42b. Thus, hydraulic pressure can move the piston 42b back and forth within the outer cylinder 42a to cause the arm 42c and the outer cylinder 42a to move axially relative to each other to move the cab. The tilt actuator 42 is disposed generally in a middle relative to left and right sides of the cab 22 to smoothly move the cab 22.

The lock 44 is arranged to selectively lock the cab 22 in the upright position relative to the chassis 20. In the illustrated embodiment, lock 44 includes a pair of (e.g., left and right) locking devices 44A and 44B. The locking devices 44A and 44B are identical to each other, except that the locking devices are mirror images of each other. Therefore, only one of the locking devices 44A and 44B need be discussed and illustrated in detail herein, and like names will be given to like parts. Although the illustrated embodiment uses a pair of locking devices 44A and 44B, it will be apparent to those skilled in the art from this disclosure that more or fewer locking devices are possible. In any case, in the illustrated embodiment, the lock 44 includes at least one lock device 44A or 44B movable between a lock position to lock the cab 22 in the upright position and a release position in which the cab 22 is movable from the upright position.

In the illustrated embodiment, each lock device 44A and 44B is a hydraulic locking device such as a hydraulic cylinder. Hydraulic cylinders are generally well known, and thus will not be explained or illustrated herein except as related to the present disclosure. Thus, each lock device 44A and 44B includes an outer cylinder 46a, a piston 46b disposed in the outer cylinder 46a and an arm or lock pin 46c connected to the piston 46b to move axially with respect to the outer cylinder 46a in response to movement of the piston 46b. Hydraulic lines are connected on opposite sides of the piston 46b to move the piston 46b back and forth along an axially direction of lock device 44A or 44B. The outer cylinder 46a is non-movably fixed relative to either the cab 22 or the machine body 16. The lock pin 46c selective engages with a part of the other of either the cab 22 or the machine body 16 to lock the cab 22 in position relative to the machine body 16. Thus, the at least one lock device 44A or 44B is a hydraulic lock pin 46c, or includes a hydraulic lock pin 46c.

Each lock device 44A and 44B further includes a biasing member 46d that normally biases the piston 46b and the lock pin 46c toward a lock position. Thus, even if there is a loss of hydraulic pressure the lock devices 44A and 44B and the lock 44 can be maintained in the lock position. Therefore, the lock 44 includes at least one biasing member 44d normally biasing the at least one lock device 44A and 44B toward the lock position. In the illustrated embodiment, the biasing member 46d is a coil spring disposed within the outer cylinder 46a biasing the piston 46b toward the lock position. The biasing members 46d can be seen in FIGS. 11-12 and 15. In addition, one of the lock devices 44A and 44B includes detectable ring 46e (e.g., a magnetic metal ring) mounted on the lock pin 46c. A sensor 48 detects whether the lock devices 44A and 44B are in the lock or release position by detecting the position of the detectable ring 46e.

As best seen in FIGS. 6-8, 11 and 12, the lock 44 further includes the sensor 48 arranged to detect whether the at least one lock device 44A and 44B is in the lock position or the release position. The sensor 48 is mounted adjacent the lock pin 46c of the right lock device 44B. The sensor 48 has two sensor regions 48a and 48b that send a signal when the detectable ring 46e is within a certain distance of the region 48a or 48b. In this manner, the sensor 48 can determine and/or send a signal indicating if the lock pin 46c is in the release position of FIG. 11 or the lock position of FIG. 12. The sensor 48 is a conventional proximity sensor that uses non-contact activation. One example of such a proximity sensor is the PRX+4800 sold by HSI Sensing. Since the sensor 48 is conventional, the sensor 48 will not be discussed and illustrated in detail herein, except as related to the present disclosure.

In the illustrated embodiment, the tilt mechanism 40 preferably further includes a tilt controller 50. The tilt controller 50 can be electronic or mechanical/electrical. In either case, the tilt controller 50 is operatively connected to the tilt mechanism 40, the tilt controller 50 being operable by an operator to control the actuator 42 and the lock 44 to move the cab 22 between the upright and recumbent positions.

Figure 7:
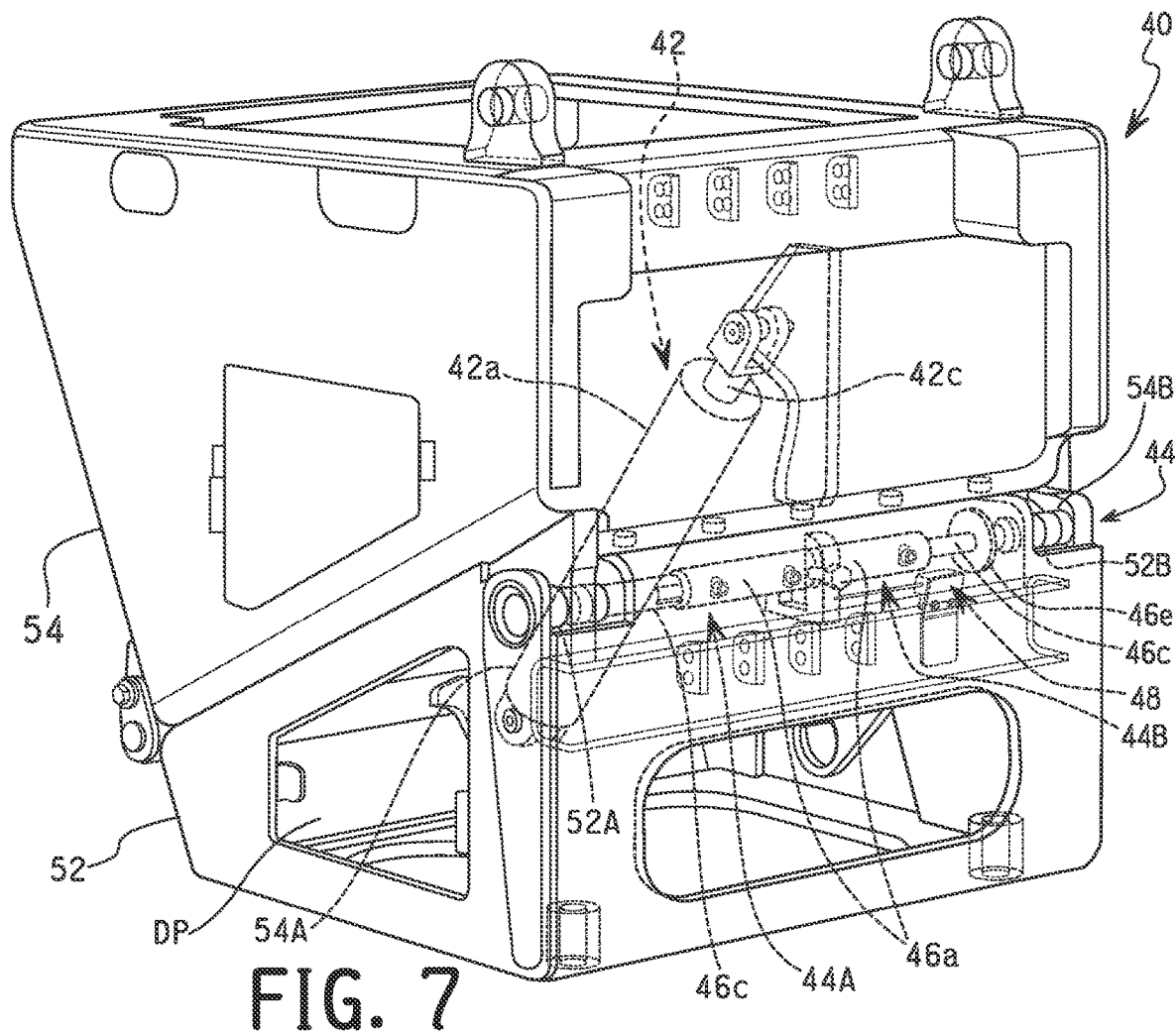
FIG. 7 is a further enlarged perspective view of the lower riser and upper riser of the cab structure illustrated in FIGS. 4-5, with portions broken away for the purpose of illustration.
Figure 8:
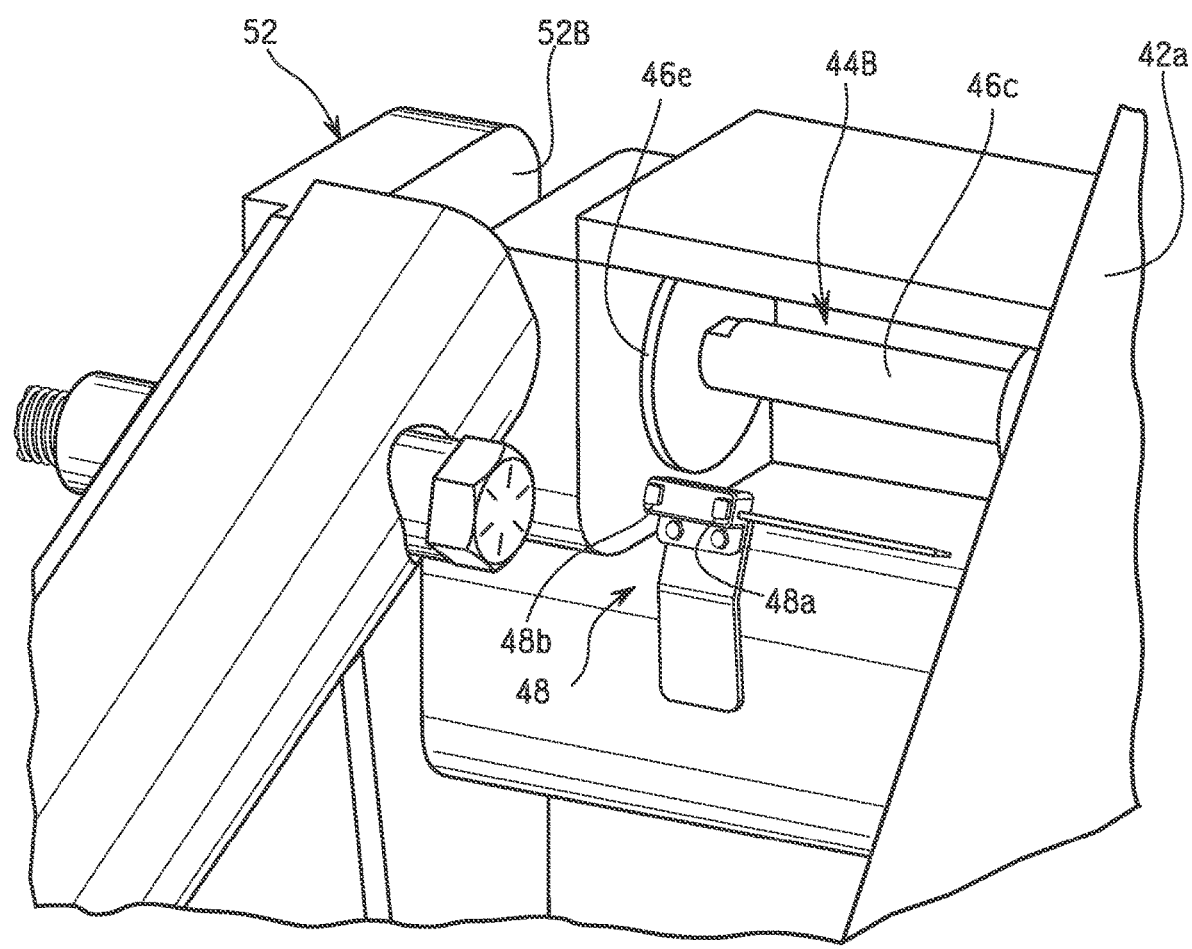
FIG. 8 is an enlarged partial perspective of the cab structure illustrated in FIGS. 4-5 and 7, with portions broken away in order to better illustrate a sensor and one of the locking pins.

In addition, the tilt controller 50 can be wired or wireless. In the illustrated embodiment, the tilt controller 50 is a wired pendant accessible through a door panel DP of the main body 16, as best seen in FIGS. 4, 5 and 7. Thus, the tilt controller 50 is disposed outside the cab 22. The tilt controller may have it's own processor, RAM/ROM, programming, etc. or may be connected to a central controller C. The central controller C is a conventional controller, utilizing conventional parts such as memory (RAM/ROM) a CPU, input/output interfaces, and programming, etc. In the illustrated embodiment, the tilt controller 50 is a wired switch controller (pendant) connected to the central controller C to control the tilt mechanism in accordance with this disclosure. The elements of the tilt controller 50 and the central controller C are well known in the art, and thus, will not be discussed and/or illustrated in detail herein, except for the programming of the present disclosure illustrated in FIGS. 13-14.

At least one of the tilt controller 50 and the central controller C are connected to the display D within the cab 22. Therefore, the sensor 48 can sends a signal to an interior of the cab 22 when the at least one lock device 44B is not in the lock position. In this manner, if an operator is in the cab 22 an indicator is present to notify the operator that the cab 22 is not in the lock position. In the illustrated embodiment, the display D has the indicator. However, other indicators are possible such as a light or an audible indicator. In any event, the cab 22 preferably includes an indicator configured to notify an operator that the at least one lock device 44B is not in the lock position. In addition, at least one operation of the work machine 10 is disabled in response to detection by the sensor 48 that the at least one lock device 44B is not in the lock position. For example, movement of the ground propulsion apparatus 12, operation of the work implement 18 and/or pivoting of the main body 16 relative to the undercarriage frame 14 can be disabled when the cab 18 is not in the lock position.

Figure 9:
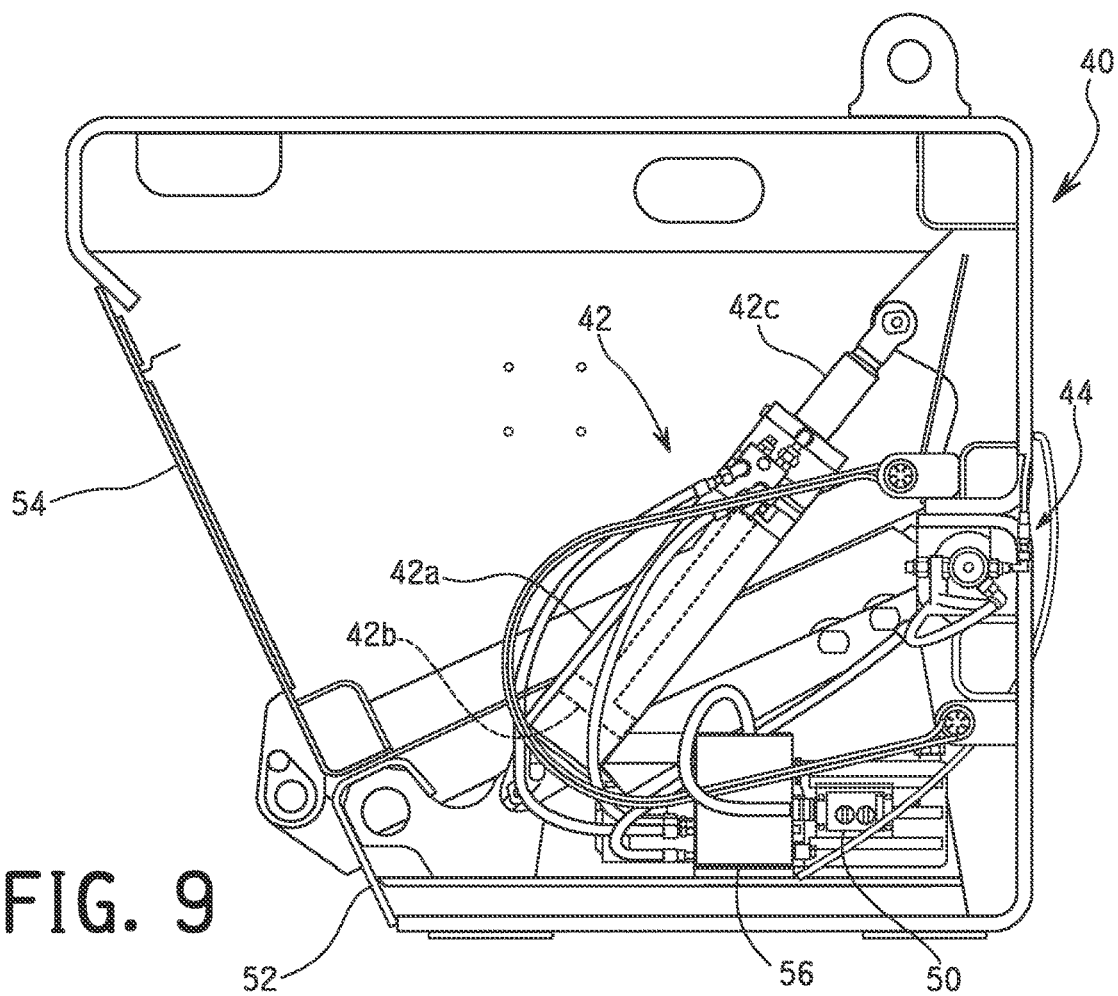
FIG. 9 is an enlarged side elevational view of the tilting and locking mechanisms of the work machine illustrated in FIGS. 1-8, with portions broken away for the purpose of illustration.
Figure 10:
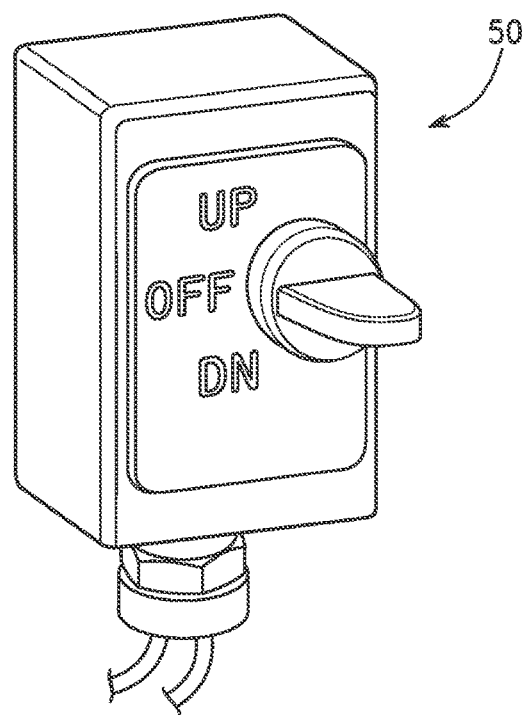
FIG. 10 is an enlarged perspective view of a control pendant of the tilting mechanism, which is usable to tilt (retract) and reverse tilt (extend) the cab.
Figure 11:
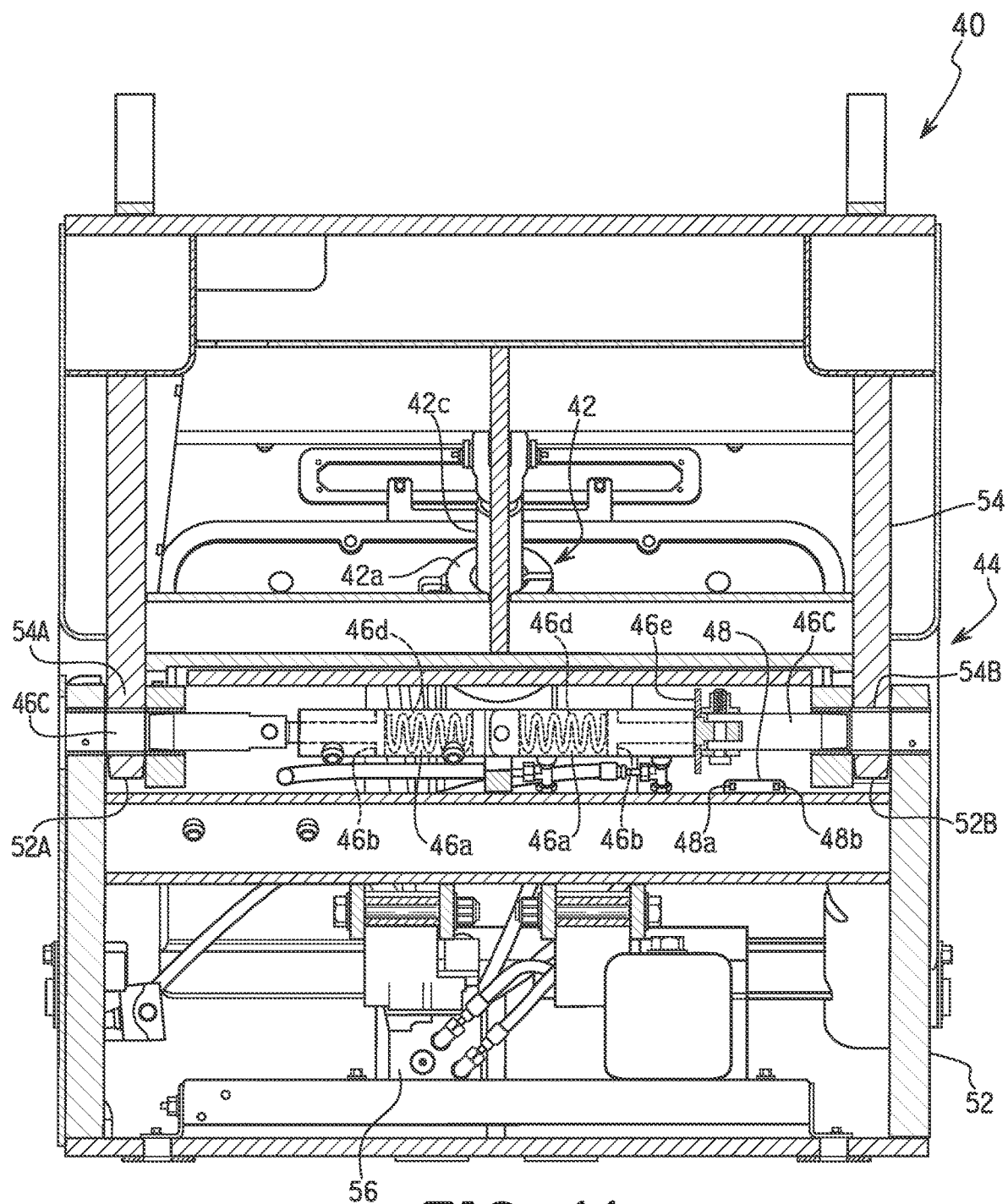
FIG. 11 is cross-sectional illustration of the locking pins of the locking mechanism illustrated in FIGS. 6-9, with the pins in the release positions (springs compressed) to allow the upper riser to move relative to the lower riser.
Figure 12:
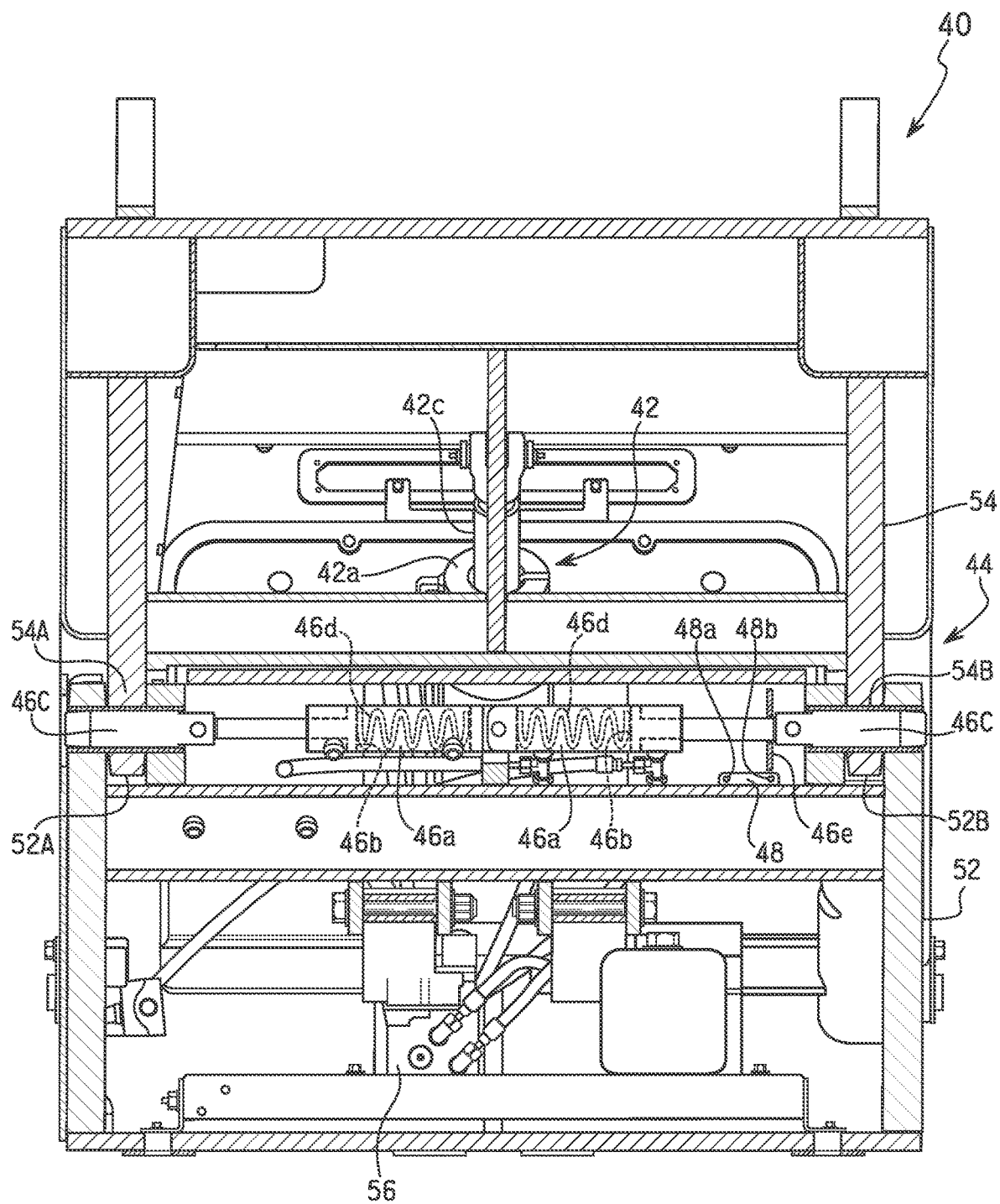
FIG. 12 is cross-sectional illustration of the locking pins of the locking mechanism illustrated in FIGS. 6-9, with the pins in the locked positions (springs expanded) to prevent the upper riser from moving relative to the lower riser.

Referring still to FIGS. 4-12, although the cab 22 can be coupled to the chassis 20 in a variety of ways, in the illustrated embodiment, the tilt mechanism 40 preferably includes a lower riser 52 and an upper riser 54 pivotally attached to the lower riser 52. The lower riser 52 is non-movably attached to the chassis 20. The upper riser 54 is non-movably attached to the cab 22. The tilt actuator 42 is coupled between the lower and upper risers 52 and 54 to move the upper riser 54 relative to the lower riser 52. Thus, the cab 22 is moved relative to the chassis 20 when the tilt actuator 42 is activated via the tilt controller 50. More specifically, the outer cylinder 42a is attached to the lower riser 52, and the rod 42c is attached to the upper riser 54, as best seen in FIGS. 7 and 9. Therefore, when the rod 42c moves relative to the outer cylinder 42a, the upper riser 54 moves relative to the lower riser 52.

Each of the lower and upper risers 52 and 54 are constructed of strong rigid material such as a metallic material (e.g., steel). Each of the lower and upper risers 52 and 54 has an irregular box shaped configuration, with four sides of unequal lengths. The lower front edge of the upper riser 54 is pivotally attached to the upper front edge of the lower riser 52. The lock devices 44A and 44B lock the lower rear edge of upper riser 54 to the upper rear edge of the lower riser 52. In particular, the lower riser has a pair of slots 52A and 52B, and the upper riser has a pair of flanges 54A and 54B selectively received in the slots 52A and 52B of the lower riser 52. In addition, the lock devices are attached to the lower riser 52. In particular, the outer cylinders 46a are non-movable attached to the lower riser 52. Holes are formed on both sides of the slots 52A and 52B and in the flanges 54A and 54B to receive the lock pins 46c therein. Of course, the arrangements could be reversed. However, a preferable arrangement is illustrated in that the hydraulic components, e.g., the outer cylinders 42a and 46a, the hydraulic lines for the tilt actuator 42 and the lock devices 44A and 44B and a sequencing valve 56 are mounted to the stationary part (lower riser 52).

Figure 13:
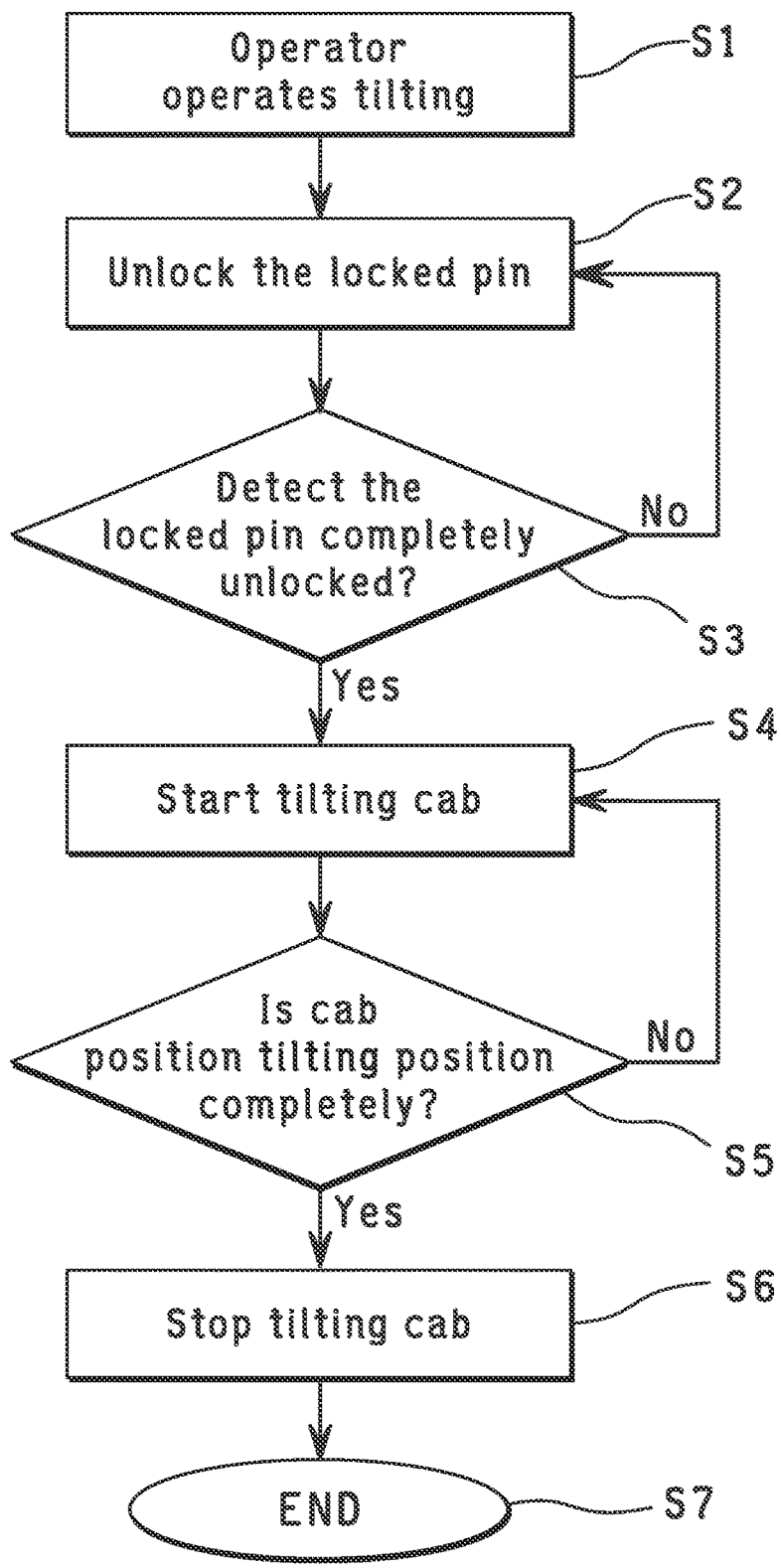
FIG. 13 is a flow chart illustrating the control logic for the titling (retracting) operation of the work machine illustrated in FIGS. 1-12, i.e., the operation of moving the cab from the position shown in FIG. 4 to the position shown in FIG. 5.
Figure 14:
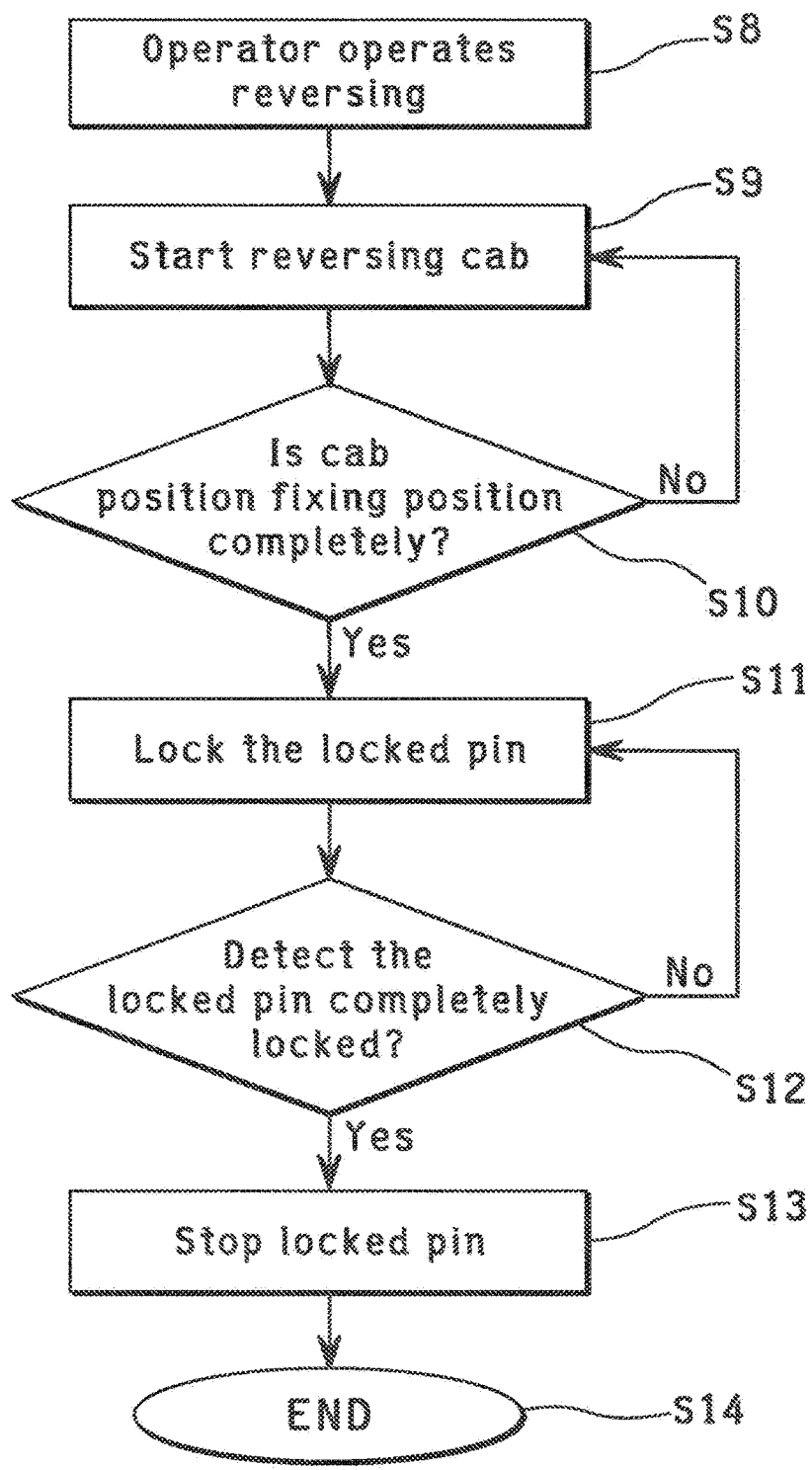
FIG. 14 is a flow chart illustrating the control logic for the reverse tilting (extending) operation of the work machine illustrated in FIGS. 1-12, i.e., the operation of moving the cab from the position shown in FIG. 5 to the position shown in FIG. 4.

Referring now to FIGS. 13-14 the movement of the cab 22 will now be explained in more detail. A method of moving the cab 22 of the work machine 10 includes tilting the cab 22 relative to the chassis 20 of the machine body 16 from an upright position (FIG. 4) to a recumbent position (FIG. 5) is illustrated in FIG. 13. The tilting the cab 22 includes moving the lock 44 (lock devices 44A and 44B) from a lock position to a release position, and then moving the cab 22 relative to the chassis 20 from the upright position to the recumbent position. The lock 44 selectively locks the cab 22 in the upright position relative to the chassis 20 in the lock position. The method also preferably includes reverse tilting the cab 22 relative to the chassis 20 from the recumbent position (FIG. 5) to the upright position (FIG. 4), as illustrated in FIG. 14. The reverse tilting the cab 22 includes moving the cab 22 relative to the chassis from the recumbent position to the upright position, and moving the lock 44

(lock devices 44A and 44B) from the release position to the lock position to lock the cab 22 in the upright position relative to the chassis 20.

The method of tilting of FIG. 13 will now be discussed in more detail. First in step S1, the tilt controller 50 as actuated by the user to the up position shown in FIG. 10. Next in step S2 the lock pins 46c are unlocked. In particular, hydraulic fluid is sent to move the lock pins 46c from the locked positions to the release positions. Next in step S3 it is determined if the lock pins 46c are in the unlocked positions (e.g., are the lock pins 46c completely unlocked). If so, the logic proceeds to step S4. If not, the logic returns to step S2 to unlock the lock pins 46c. Once it is confirmed that the lock pins 46c are completely unlocked, the logic will be at step S4. At step S4 the tilt actuator 42 starts tilting the cab 22. In particular, hydraulic fluid is sent to the tilt actuator 42 to move the upper riser 54 away from the lower riser 52. The logic then proceeds to step S5. In step S5 it is determined if the cab 22 is tilted completely or not. If so, the logic proceeds to step S6 and stops tilting the cab 22. If not, the logic returns to step S4 and continues to tilt the cab 22. Once step S6 is completed, then the logic ends at step S7. This is all done in one sequence via a remote pendant.

The method of reversing of FIG. 14 will now be discussed in more detail. First in step S8, the tilt controller 50 as actuated by the user to the down position shown in FIG. 10. Next in step S9 reversing movement of the cab 22 is started. In particular, hydraulic fluid is sent to move the arm 42c from the extended position of FIG. 5 to the retracted position of FIG. 4. Next in step S10 it is determined if the cab 22 has been moved completely back to the upright position of FIG. 4. If so, the logic proceeds to step S11. If not, the logic returns to step S9 to continue reversing the cab. Once it is confirmed that the cab 22 has been moved completely back to the upright position, the logic is at step S11. AT step S11, the lock pins 46c are moved from the release positions of FIG. 11 to the lock positions of FIG. 12. In particular, hydraulic fluid is sent to the lock devices 44A and 44B to move the lock pins 46c outwardly into the holes of the lower and upper risers 52 and 54. The logic then proceeds to step S12. In step S12 it is determined if lock 44 (lock devices 44A and 44B) are completely locked. If so, the logic proceeds to step S13 and stops moving the lock pins 46c. If not, the logic returns to step S11 and continues to move the lock pins 46c. Once step S13 is completed, then the logic ends at step S14. This is all done in one sequence via a remote pendant.

Steps S3 and S12 utilize the sensor 48, which can detect if the lock pin is in the lock position or the release position. However, steps S5 and S10 do not utilize a sensor, as now explained in more detail. Only one sensor 48 is needed with two choices, pin locked or pin not locked for steps S3 and S12. However, regarding step S5, when opening the operator can see when the cab 22 is tilted sufficiently and can turn off the tilt controller 50 from the "UP" position at that point. However, when closing (moving the cab 22 to the upright position of FIG. 4), according to step S10, the operator does not determine when the cab 22 is in the fully closed position upon using closing function. Rather, there is a mechanical hard stop that does this, (accurately set-up during assembly) to allow pin alignment. This ensures that the pins 46c are aligned with the holes prior to moving the pins 46c. More specifically, the operator turns the tilt controller 50 knob to "DN" on the pendant and the sequencing valve 56 does everything after. The sequencing valve 56 determines when cab 22 cannot tilt closed anymore, via hydraulic pressure. Once the cab 22 hits the hard stop, (closed), the sequencing valve 56 sees a pressure spike and "shifts" hydraulic flow to locking pin cylinders 46a. After hydraulic pressure sensor in the sequencing valve detects hydraulic pressure spike, the cab cannot tilt closed anymore, and/or other detection information, the sequencing valve 56 shifts hydraulic flow to locking pin cylinders. This is where the sensor 48 comes into play, sending a signal to computer (controller C) when pin 46c is locked, verifying all is acceptable. The sensor assists in addition, because, if somehow, the cab got open stuck mechanically, it would pressure spike the sequence valve, tricking it to think cab is closed. It would take very odd situation for the open cab to stay open under the severe cylinder force, though this plans for that. The operator has all the control via pendant knob as he must continue to turn knob until pins are locked. The tilt controller 50 can also move the cab 22 and the lock 44 separately. In that case, the operator turns on the controller 50 to move the cab 22 for tilting/reversing and the lock 44 to lock position/release position separately.

Figure 15:
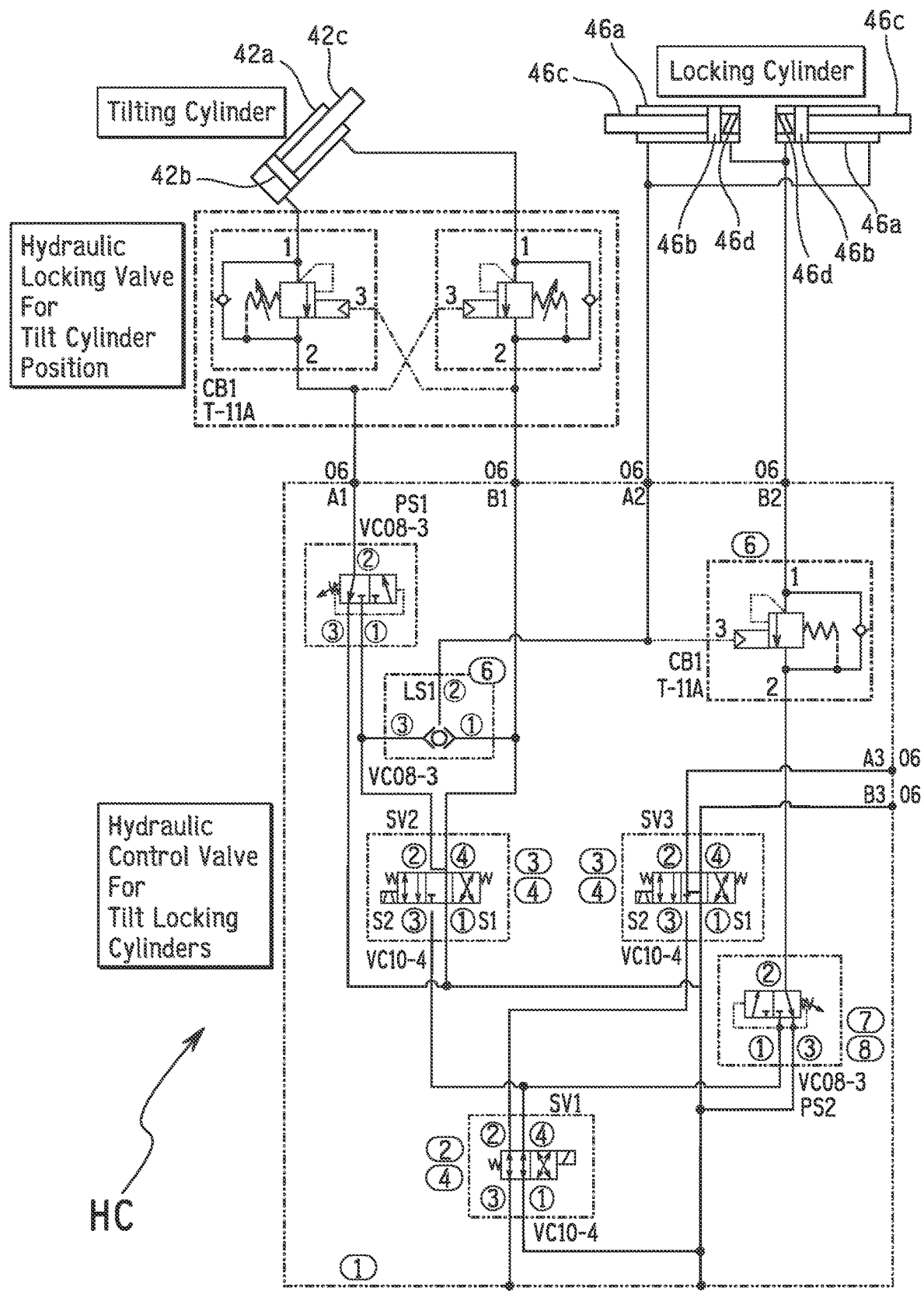
FIG. 15 is a schematic illustration of the hydraulic circuit of the tilting mechanism of the work machine illustrated in FIGS. 1-14.

Referring to FIG. 15, the hydraulic circuit HC of the tilting mechanism is illustrated. Some or all of the parts of the valves and hydraulic lines can be considered parts of the sequencing valve 56 of the present disclosure. The parts of the sequencing valve 56 are conventional, except how they are connected to operate the tilt mechanism 40 as explained herein. The lock devices 44A and 44B are not limited to only pin type, but also any other type of locking systems are possible.

Many parts of the work machine are conventional components that are well known in the work machine field. Since these components are well known in the work machine field, these structures will not be discussed or illustrated in detail herein, except as related to the disclosure set forth in the following claims.

As used herein, the following directional terms "forward, rearward, above, downward, vertical, horizontal, below and transverse" as well as any other similar directional terms refer to those directions of a work machine on a level surface. Accordingly, these terms, as utilized to describe the present disclosure should be interpreted relative to a work machine equipped with the present disclosure. The terms of degree such as "substantially", "about" and "approximately" as used herein mean a amount of deviation of the modified term such that the end result is not significantly changed.

While only selected embodiments have been chosen to illustrate the present disclosure, it will be apparent to those skilled in the work machine field from this disclosure that various changes and modifications can be made herein without departing from the scope of the disclosure as defined in the appended claims. Furthermore, the foregoing descriptions of the embodiments according to the present disclosure are provided for illustration only, and not for the purpose of limiting the disclosure as defined by the appended claims and their equivalents. Thus, the scope of the disclosure is not limited to the disclosed embodiments.

What is claimed is:

1. A work machine comprising:
   a ground propulsion apparatus;
   a undercarriage frame supported by the ground propulsion apparatus;
   a machine body supported by the undercarriage frame, the machine body including a chassis coupled to the undercarriage frame, a cab supported on the chassis, and a compartment of an engine disposed adjacent to the cab;
   a work implement attached to at least one of the undercarriage frame and the machine body; and a tilt mechanism arranged to tilt the cab relative to the chassis between an upright position and a recumbent transport position, the tilt mechanism including
a lower riser directly and non-movably attached to the chassis adjacent to the compartment of the engine,
an upper riser non-movably attached to the cab, the upper riser being pivotally coupled to the lower riser,
an actuator arranged to move the cab relative to the chassis, and
a lock arranged to selectively lock the cab in the upright position relative to the chassis.

2. The work machine according to claim 1, wherein the actuator is a hydraulic tilt actuator.

3. The work machine according to claim 1, wherein the lock includes at least one lock device movable between
a lock position to lock the cab in the upright position and
a release position in which the cab is movable from the upright position.

4. The work machine according to claim 3, wherein the at least one lock device includes a hydraulic lock pin.

5. The work machine according to claim 3, wherein the lock further includes at least one biasing member normally biasing the at least one lock device toward the lock position.

6. The work machine according to claim 3, wherein the lock further includes a sensor arranged to detect whether the at least one lock device is in the lock position or the release position
the cab includes an indicator configured to notify an operator that the at least one lock device is not in the lock position.

7. The work machine according to claim 3, wherein the lock further includes a sensor arranged to detect whether the at least one lock device is in the lock position or the release position
at least one operation of the work machine is disabled in response to detection by the sensor that the at least one lock device is not in the lock position.

8. The work machine according to claim 1, further comprising:
a tilt controller operatively connected to the tilt mechanism, the tilt controller being operable by an operator to control the actuator and the lock to move the cab between the upright and recumbent transport positions, and
the tilt controller is disposed outside of the cab.

9. A method of moving a cab of a work machine during transportation, the method comprising:
tilting the cab relative to a chassis of a machine body having a compartment of an engine from an upright position to a recumbent transport position, the tilting the cab including
moving a lock from a lock position to a release position, the lock selectively locking the cab in the upright position relative to the chassis in the lock position, and
once the lock is in the release position, moving the cab relative to the chassis from the upright position to the recumbent transport position,
the tilting the cab being performed without involvement of the compartment of the engine.

10. The method according to claim 9, wherein the moving the cab relative to the chassis is performed by hydraulic actuation.

11. The method according to claim 9, wherein the moving the lock is performed by hydraulic actuation.

12. The method according to claim 9, wherein the lock is biased toward the lock position by a biasing member.

13. The method according to claim 9, further comprising determining whether the lock is in the lock position or the release position.

14. The method according to claim 13, further comprising:
indicating in an interior of the cab when the lock is not in the lock position.

15. The method according to claim 13, further comprising:
disabling at least one operation of the work machine in response to determining that the at least one lock pin is not in the lock position.

16. The method according to claim 9, further comprising:
operating a tilt controller outside the cab to control movement of the cab and lock.

17. The method according to claim 9, further comprising:
receiving the signal to tilt the cab to the recumbent transport position, the moving the lock to the release position occurring upon receiving the signal; and
determining the lock in the release position, the moving the cab to the recumbent transport position occurring in response to determining that the lock is in the release position.

18. A method of moving a cab of a work machine during transportation, the method comprising:
tilting the cab relative to a chassis of a machine body having a compartment of an engine from a recumbent transport position to an upright position, the tilting the cab including
moving the cab from the recumbent transport position to the upright position, and
once the cab is in the upright position, moving a lock from a release position to a lock position, the lock selectively locking the cab in the upright position relative to the chassis in the lock position,
the tilting the cab being performed without involvement of the compartment of the engine.

19. The method according to claim 18, further comprising:
receiving the signal to tilting cab to upright position, the moving the cab to the upright position occurring upon receiving the signal; and
determining whether the cab in the upright position, the moving the lock to the lock position occurring in response to determining that the cab is in the upright position.

20. The work machine according to claim 1, wherein a first overall height of the work machine in the upright position is higher than a second overall height of the work machine in the recumbent transport position.

21. The work machine according to claim 20, wherein the second overall height is in a range of 75% to 80% of the first overall height.

22. The method according to claim 9, wherein a first overall height of the work machine in the upright position is higher than a second overall height of the work machine in the recumbent transport position.

23. The method according to claim 22, wherein the second overall height is in a range of 75% to 80% of the first overall height.

* * * * *